US009395727B1

(12) United States Patent
Smith et al.

(10) Patent No.: US 9,395,727 B1
(45) Date of Patent: Jul. 19, 2016

(54) SINGLE LAYER SHARED APERTURE BEAM FORMING NETWORK

(71) Applicant: Google Inc., Mountain View, CA (US)

(72) Inventors: Russell Smith, Santa Clara, CA (US); Jamal Izadian, San Jose, CA (US)

(73) Assignee: Google Inc., Mountain View, CA (US)

(*) Notice: Subject to any disclaimer, the term of this patent is extended or adjusted under 35 U.S.C. 154(b) by 508 days.

(21) Appl. No.: 13/849,321

(22) Filed: Mar. 22, 2013

(51) Int. Cl.
*G01S 13/93* (2006.01)
*G05D 1/02* (2006.01)
*H01Q 3/34* (2006.01)

(52) U.S. Cl.
CPC .............. *G05D 1/0257* (2013.01); *H01Q 3/34* (2013.01)

(58) Field of Classification Search
CPC . H01Q 3/26; H01Q 21/0006; H01Q 21/0025; H01Q 3/34; G01S 13/4463; G01S 2013/0245; G05D 1/0257
USPC .................................. 342/70, 194, 354, 368
See application file for complete search history.

(56) References Cited

U.S. PATENT DOCUMENTS

| | | | | |
|---|---|---|---|---|
| 4,688,006 A * | 8/1987 | Wong | ...................... | H01P 5/182 333/113 |
| 4,752,781 A * | 6/1988 | Wood | ................... | H01Q 21/005 343/771 |
| 5,115,248 A | 5/1992 | Roederer | | |
| 6,075,500 A * | 6/2000 | Kurz | ...................... | H01Q 1/084 343/895 |
| 6,104,343 A * | 8/2000 | Brookner | ................ | H01Q 3/26 342/372 |
| 6,133,869 A * | 10/2000 | McGill | .................... | G01S 11/02 342/351 |
| 7,639,171 B2 | 12/2009 | Alland et al. | | |
| 7,813,766 B1 | 10/2010 | Lam | | |
| 8,344,945 B2 | 1/2013 | Craig et al. | | |
| 2004/0235528 A1 | 11/2004 | Korisch | | |
| 2006/0212237 A1* | 9/2006 | Xin | .......................... | G01S 3/74 702/65 |
| 2007/0001897 A1* | 1/2007 | Alland | .................... | G01S 7/288 342/70 |
| 2011/0102263 A1 | 5/2011 | Angeletti | | |
| 2013/0027240 A1* | 1/2013 | Chowdhury | ............ | G01S 7/032 342/94 |

OTHER PUBLICATIONS

Pompei et al., "Phased array element shapes for suppressing grating lobes", May 2002.
Haynes, Spectrum Signal Processing, "A Primer on Digital Beamforming", Mar. 26, 1998.
Kimura et al., "76GHz alternating-phase fed single-layer slotted waveguide arrays with maximum gain and sidelobe suppression", IEEE, 2005.

(Continued)

*Primary Examiner* — John B Sotomayor
*Assistant Examiner* — Marcus Windrich
(74) *Attorney, Agent, or Firm* — McDonnell Boehnen Hulbert & Berghoff LLP

(57) ABSTRACT

A radio detection and ranging (RADAR) system that emits radio signals from a transmit antenna and receives reflected signals with a receive array of antenna elements. The signals received at the receive array are conveyed through a plurality of waveguide couplers. The plurality of waveguide couplers receives signals from each antenna element at a plurality of antenna ports and outputs signals from a plurality of output ports. The waveguide couplers convey signals such that the output ports receive signals from associated sub-array sets of the antenna ports. The waveguide couplers have an overlapping arrangement such that a given sub-array set of antenna ports overlaps with a neighboring sub-array set of antenna ports by including at least half of the antenna ports in the neighboring sub-array set.

19 Claims, 8 Drawing Sheets

(56) References Cited

OTHER PUBLICATIONS

Kimura et al., "An Alternating-Phase Fed Single-Layer Slotted Waveguide Array in 76 GHz Band and Its Sidelobe Suppression", IEICE Trans. Electron, Oct. 2005.

Kimura et al., "Design of a slot array with perturbation walls for an alternating-phase fed single-layer waveguide array", IEEE, 2008.

Stevenson, Richard, "Long-Distance Car Radar" IEEE Spectrum, Oct. 2011, 3 pages.

* cited by examiner

SINGLE LAYER SHARED APERTURE BEAM FORMING NETWORK

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a radio detection and ranging (RADAR) system. A RADAR system actively estimates distances to environmental features by emitting radio signals and detecting returning reflected signals. Distances to radio-reflective features can be determined according to the time delay between transmission and reception. The RADAR system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception antennas to associate each range estimate with a bearing. Combining the measured distances and the directional information allows for the surrounding environment features to be mapped. The RADAR sensor can thus be used by the autonomous vehicle control system to avoid obstacles indicated by the sensor information.

Beamforming is the combination of signals from an array of spatially separated antenna elements to simulate signals from larger directional antenna. The simulated antenna beam/lobe, or directional sensitivity of the array, can be electronically steered by applying phase offsets to signals received from the individual antenna elements (or to subarrays of such elements). When suitably steered, signals received at each antenna element from the desired direction of the beam are coherently combined. Phase offsets can be applied by analog phase shifters that are electronically controlled or can be applied digitally once the received signals are converted to digital. Some beamforming techniques may also weight the amplitude of the signals received from each element to further tune the nulls and lobes of the received radiation pattern.

SUMMARY

Some embodiments of the present disclosure relate to a radio detection and ranging (RADAR) system that emits radio signals from a transmit antenna and receives reflected signals with a receive array of antenna elements. The signals received at the receive array are conveyed through a plurality of waveguide couplers. The plurality of waveguide couplers receives signals from each antenna element at a plurality of antenna ports and outputs signals from a plurality of output ports. The waveguide couplers convey signals such that the output ports receive signals from associated sub-array sets of the antenna ports. The waveguide couplers have an overlapping arrangement such that a given sub-array set of antenna ports overlaps with a neighboring sub-array set of antenna ports by including at least half of the antenna ports in the neighboring sub-array set.

Some embodiments of the present disclosure provide a waveguide device. The waveguide device can include a plurality of antenna ports, a plurality of output ports, and a plurality of waveguide couplers. The plurality of antenna ports can be configured to receive signals from one or more antenna elements. The plurality of waveguide couplers can be configured to convey the signals received at the plurality of antenna ports to the plurality of output ports such that a given output port provides a combined signal from a sub-array set of antenna ports which overlaps with a neighboring sub-array set of antenna ports by including at least half of the antenna ports in the neighboring sub-array set.

Some embodiments of the present disclosure provide a device. The device can include a transmit antenna, a receive array, a waveguide device, and a receiver. The receive array can be configured to illuminate a scanning zone. The receive array can include a plurality of antenna elements configured to receive signals reflected from the scanning zone. The waveguide device can include a plurality of antenna ports, a plurality of output ports, and a plurality of waveguide couplers. The plurality of antenna ports can be configured to receive signals from the plurality of antenna elements. The plurality of waveguide couplers can be configured to convey the signals received at the plurality of antenna ports to the plurality of output ports such that a given output port provides a combined signal from a sub-array set of antenna ports which overlaps with a neighboring sub-array set of antenna ports by including at least half of the antenna ports in the neighboring sub-array set. The receiver can be configured to receive, from the plurality of output ports, the combined signal for a given sub-array set.

Some embodiments of the present disclosure provide a method. The method can include receiving reflected radio signals corresponding to emitted radio signals via a receive array of antenna elements. The method can include conveying the received reflected signals from a given one of the antenna elements in the receive array to a respective one of a plurality of antenna ports for a waveguide device. The method can include conveying the signals received at the plurality of antenna ports, through a plurality of waveguide couplers, to a plurality of output ports. The signals can be conveyed through the plurality of waveguide couplers such that a given output port provides a combined signal from a sub-array set of antenna ports which overlaps with a neighboring sub-array set of antenna ports by including at least half of the antenna ports in the neighboring sub-array set. The method can include conveying the combined signal for a given sub-array set from the plurality of output ports to a receiver.

Some embodiments of the present disclosure provide a waveguide array feed network. The waveguide array feed network can include a plurality of antenna ports, a plurality of output ports, and means for conveying signals from the plurality of antenna ports to one or more of the output ports in an overlapping arrangement of sub-arrays. The means for conveying signals can convey the signals received at the plurality of antenna ports to the plurality of output ports such that a given output port provides a combined signal from a sub-array set of antenna ports which overlaps with a neighboring sub-array set of antenna ports by including at least half of the antenna ports in the neighboring sub-array set. The means for selecting conveying signals can include a single layer waveguide.

These as well as other aspects, advantages, and alternatives, will become apparent to those of ordinary skill in the art by reading the following detailed description, with reference where appropriate to the accompanying drawings.

DETAILED DESCRIPTION

Figure 1:
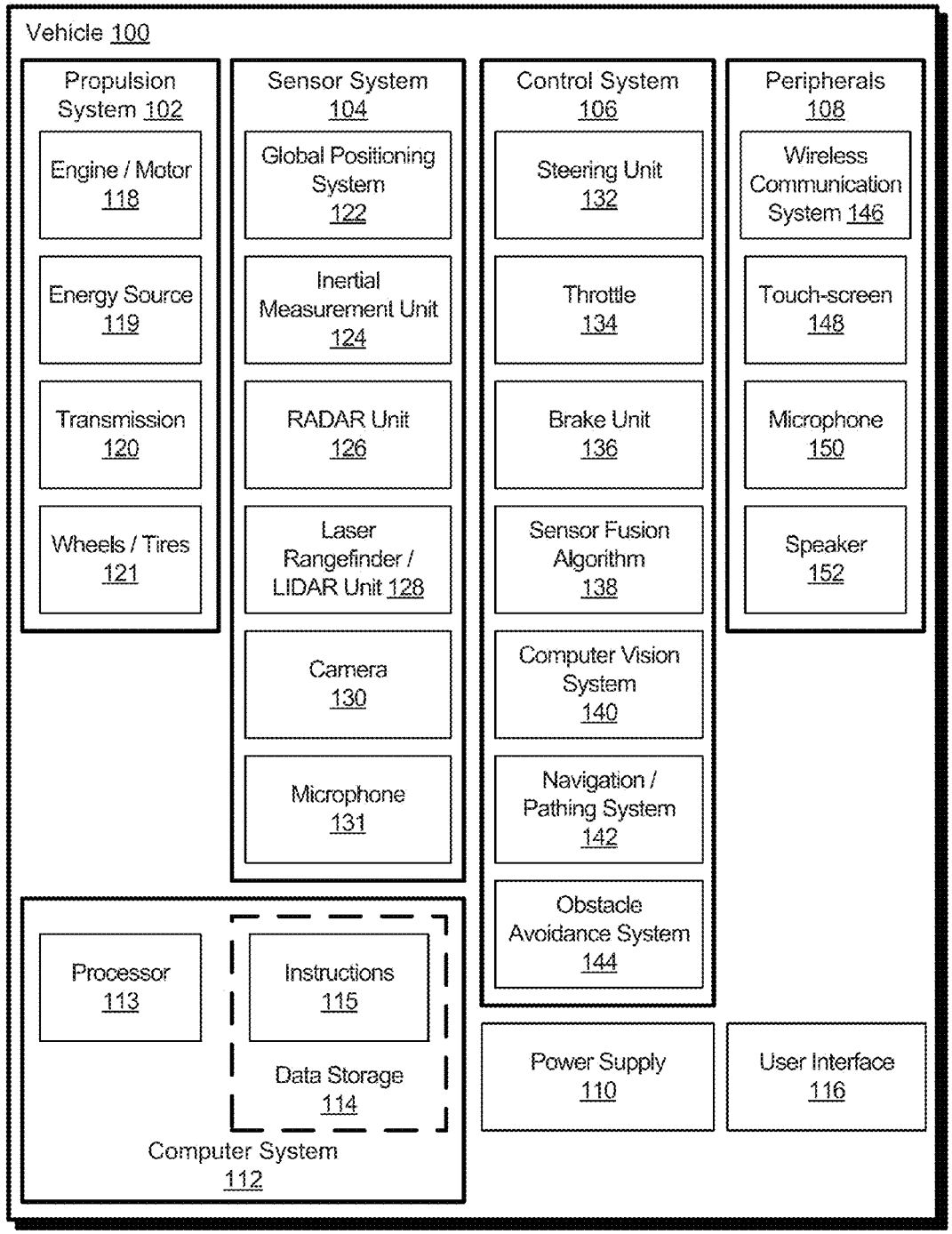
FIG. 1 is a functional block diagram depicting aspects of an example autonomous vehicle.

Example embodiments relate to an autonomous vehicle, such as a driverless automobile, that includes a radio detection and ranging (RADAR) sensor for actively detecting features in the environment surrounding the vehicle. A controller analyzes information from the RADAR sensor to identify the surroundings of the vehicle. The controller determines how to direct the propulsion systems of the vehicle to effect a navigation path that substantially avoids obstacles indicated by the information from the RADAR sensor.

The RADAR sensor can include a transmit antenna for illuminating a scanning zone and a receive antenna system for detecting reflected signals indicative of features in the scanning zone. A receive antenna system can include an antenna array that is electronically steered to receive reflected radiation from the surrounding environment in a region substantially coincident with a region illuminated by the transmit antenna. The antenna array can be arranged as a plurality of sub-arrays, with multiple antenna elements in each sub-array. An array feed network can be used to guide the signals from each antenna element in the array to a plurality of output ports for each sub-array. The output of each sub-array can be digitally manipulated (e.g., scaled with amplitude and/or phase offsets) to electronically steer the antenna array to create a receive lobe that corresponds to the illuminated region and thereby avoids multi-path ambiguities.

Moreover, the spatially separated sub-arrays can be analyzed to estimate the direction of arrival of incoming radiation based on the relative phase offset between the signals received at each sub-array, for example. However, an antenna array with a plurality of regularly spaced sub-arrays results in grating lobes outside of the main lobe. The grating lobes result in ambiguities in performing direction of arrival estimations at angles for which the spacing between sub-arrays is sufficient for incident radiation to be offset by a full phase cycle between sub-arrays, for example. In particular, where the phase centers of the sub-arrays are spaced by a distance comparable to the distance spanned by each sub-array, the minimum ambiguous angle, where signals received at each sub-array are indistinguishable due to being offset by an integer wavelength are within the main lobe of the sub-array radiation pattern. Spacing the sub-arrays closer together, such that the phase centers of adjacent ones of the sub-arrays are separated by about half the distance spanned by each sub-array causes the minimum ambiguous angle to fall outside of the main lobe. The antenna array can be grouped into a set of overlapped sub-arrays to allow the sub-arrays to be spaced closer together than the dimension of each sub-array. To satisfy the distance requirements, each sub-array can share half of its antenna elements on either side with adjacent sub-arrays.

For example, an antenna array of regularly spaced antenna elements can be grouped into sub-arrays with four adjacent antennas each. For convenience, the four antennas in each sub-array can be referred to as two left antennas and two right antennas. Each of the sub-arrays can then share their respective left antennas with a respective left-adjacent sub-array and share their respective right antennas with a respective right-adjacent sub-array (excluding the sub-arrays on the outer edges of the antenna array).

In some embodiments, an array feed network includes a network of waveguide couplers formed in a single layer construction, such as a block of metal with milled channels to define the waveguide paths. A covering of conductive material, such as a metallic foil, can be formed over the single-layer waveguide to enclose the waveguide channels. Slot apertures may be formed in the covering foil to create a plurality of slotted waveguide antennas (SWGAs).

In some embodiments, the array feed network can combine the signals from the antennas using an arrangement of short slot hybrid couplers to divide signals from the antennas to convey to more than one of the sub-array outputs. The hybrid couplers are four port devices that receive an input signal and output two versions: a transmitted signal, and a coupled signal that is phase shifted by 90° relative to the transmitted signal. Both the transmitted signal and the coupled signal are reduced in power by 3 dB. The waveguide can be arranged to pass each sub-array output to receive signals from the antennas through two hybrid couplers, with one imparting a 90° phase offset (connected as a coupled output), and the other connected as a transmitted output.

Thus, signals output to the sub-array outputs can all receive a 90° phase offset, such that the output signals are comparable with one another without separately accounting for the phase offsets imparted by the hybrid couplers. In other words, the array feed network can be configured such that the signals output for each sub-array can have a common phase reference, relative to the phase of the signals measured at the receive antenna array. The combined signals for each sub-array can therefore have a common phase reference.

Unused ports of the hybrid couplers can be connected to energy absorbing materials to prevent internal reflections in the waveguide leading to side lobes in the radiation pattern. The radiation-absorbing materials can be energy absorbing terminations can also allow the array feed network to provide good isolation between separate sub-array ports.

In example embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE.

Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144.

The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
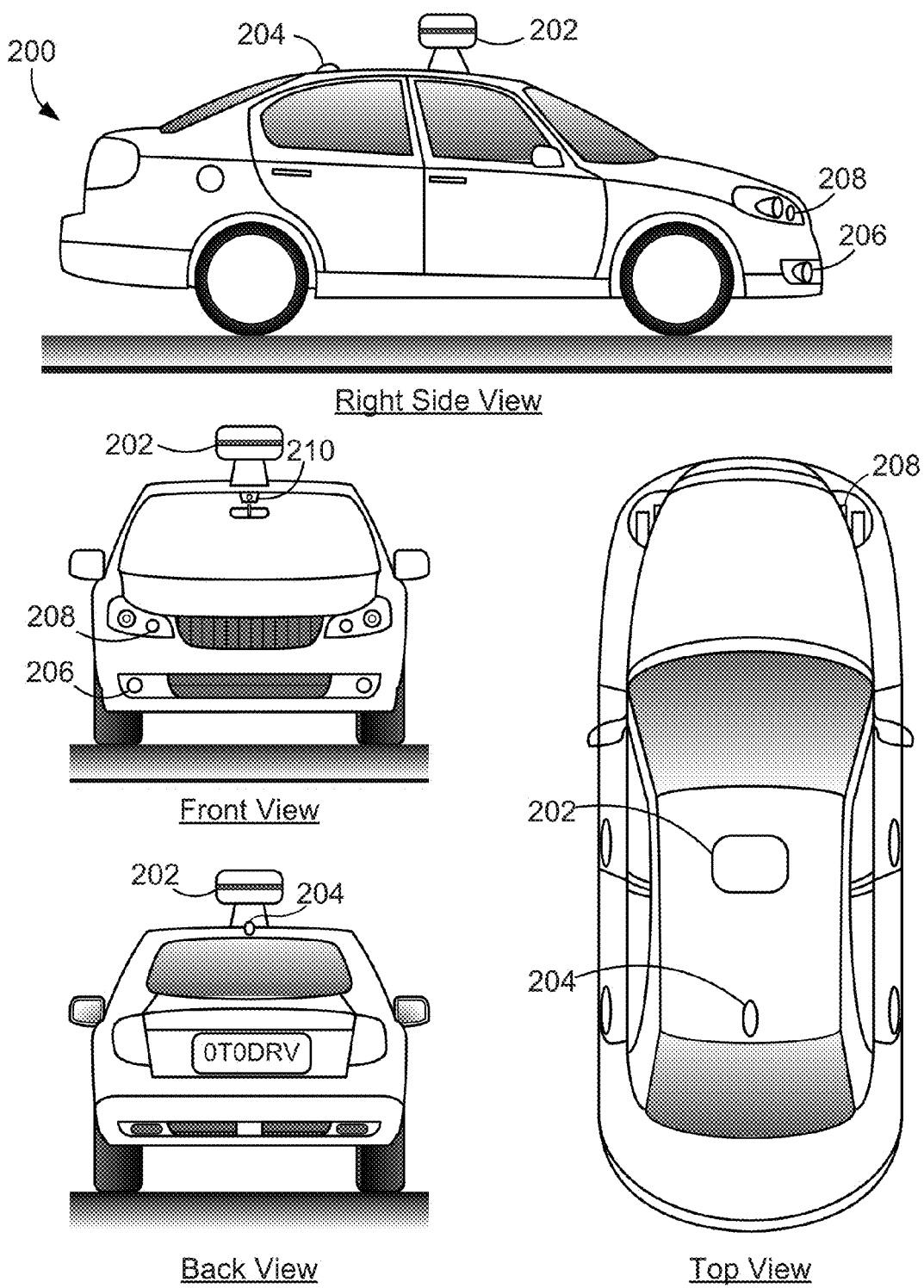
FIG. 2 depicts exterior views of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include those locations illustrated in connection with RADAR unit 206 and laser rangefinder unit 208. Furthermore, each sensor of sensor unit 202 can be configured to be moved or scanned independently of other sensors of sensor unit 202.

The wireless communication system 204 can be located on a roof of the vehicle 200 as depicted in FIG. 2. Alternatively, the wireless communication system 204 can be located, fully or partially, elsewhere on the vehicle 200. The wireless communication system 204 may include wireless transmitters and receivers that may be configured to communicate with devices external or internal to the vehicle 200. Specifically, the wireless communication system 204 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. Accordingly, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as via a pan/tilt mechanism.

Figure 3:
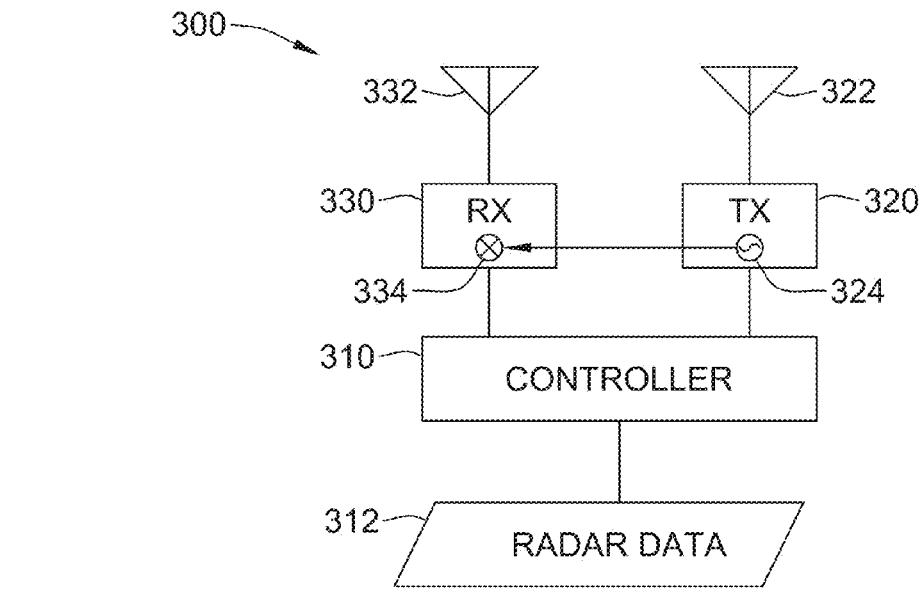
FIG. 3 is a block diagram of an example RADAR system.

FIG. 3 is a block diagram of an example RADAR system 300. The system 300 includes a receiver 330 connected to receive signals from a receive antenna 332 and a transmitter 320 connected to emit signals from a transmit antenna 322. The receiver 330 and transmitter 320 are each connected to a controller 310, which provides command and control instructions to both the transmitter 320 and the receiver 330.

The controller 310 sends instructions to the transmitter 320 to cause radio signals to be emitted from the transmit antenna 322. The transmitter 320 can accordingly include local oscillators, mixers, amplifiers and the like to create driving signals to operate to the transmit antenna 322 in accordance with the instructions from the controller 310. The transmit antenna 322 receives the driving signals from the transmitter 320 and emits radio frequency radiation. The emitted radiation from the transmit antenna 322 is incident on surrounding environmental features and reflected back to be detected by the receive antenna 332.

The reflected signals received at the receive antenna 332 are conveyed to the receiver 330. The receiver 330 can condition the signals for further processing by the controller 310. For example, the receiver 330 may include one or more mixers, filters, amplifiers, samplers, analog to digital converters, and the like to create outputs to pass to the controller 310 in accordance with the reflected signals received at the receive antenna 332. The receiver 330 may include a filter, a radio frequency amplifier, a down converter, and an analog to digital converter to generate a digital input to the controller 310. As shown in FIG. 3, a signal can be conveyed from a local oscillator 324 included in the transmitter 320 to the receiver 330. The conveyed signals can be a copy of the transmitted radiation. The receiver 330 can include a mixer 334 to mix the signal from the local oscillator 324 (i.e., copy of the transmitted signal) with signals from the reflected radiation received via the antenna 332. The output of the mixer 334 can then indicate the relative frequency shift of the reflected radiation, such as due to Doppler Effect frequency shifts in the reflected radiation. The local oscillator 324 can thereby be used as a reference to compare with the received reflected radiation and thereby sensitize the radar system 300 to reflected signals from objects in motion relative to the system 300. For example, the radar system 300 may be operated in a frequency-modulated continuous wave (FMCW) mode in which the transmitted radiation changes frequency over time in accordance with a regularly repeating pattern. The local oscillator 324 signal sent back to the mixer 334 in the receiver 330 can then be used as a reference to compensate for the time-variant FMCW pattern.

The controller 310 analyzes the information from the receiver 330 to estimate ranges to the radio-reflective features responsible for reflected radio signals detected by the receive antenna 332. The controller 310 may, for example, determine the time delay between the emission of radiation from the transmit antenna 322 and the reception of corresponding reflected radiation at the receive antenna 332. The determined time delay can then be used to determine the distance to the radio-reflective features based on the measured time-of-flight. Additionally or alternatively, the system 300 may be operated in a frequency modulated continuous wave mode where the transmitter 320 causes the transmit antenna 322 to emit a signal with a time-changing frequency. The emitted signal may have a frequency that changes in time in accordance with a frequency sawtooth pattern, for example. When the time-changing frequency pattern of the emission signal is well characterized, the frequency difference between the received reflected signals and the emitted signal can be mapped to a corresponding time delay between emission and reception.

In some examples, one or both of the antennas 322, 332 can be directional antennas that are scanned across a scanning zone. For example, one or both of the antennas 322, 332 may be scanned across a scanning zone with an azimuthal span. Information indicative of the orientations of one or both antennas can then be used to determine the direction toward any reflective features that are detected. Thus, a map of reflective features surrounding the RADAR system 300 can be constructed by combining the range information (based on time of frequency offset of the emitted and received signals) and the direction information (according to orientations of the transmit and/or receive antennas 322, 332). RADAR position data 312 indicating the estimated locations of the reflective features can then be output from the controller 310.

The RADAR system 300 can be operated to repeatedly scan the environmental surroundings (e.g. periodically) and generate updated position data 312. In this way, the RADAR system 300 may be used to dynamically estimate positions of reflective features, and the dynamically updated position information 312 can be used by a control system for an autonomous vehicle to make navigational decisions (e.g., the autonomous vehicle 100, 200 discussed above in connection with FIGS. 1-2). For example, the RADAR position data 312 may be refreshed at a frequency that is sufficient to provide information useful for real time navigation and/or obstacle avoidance for an autonomous vehicle.

Figure 4A:
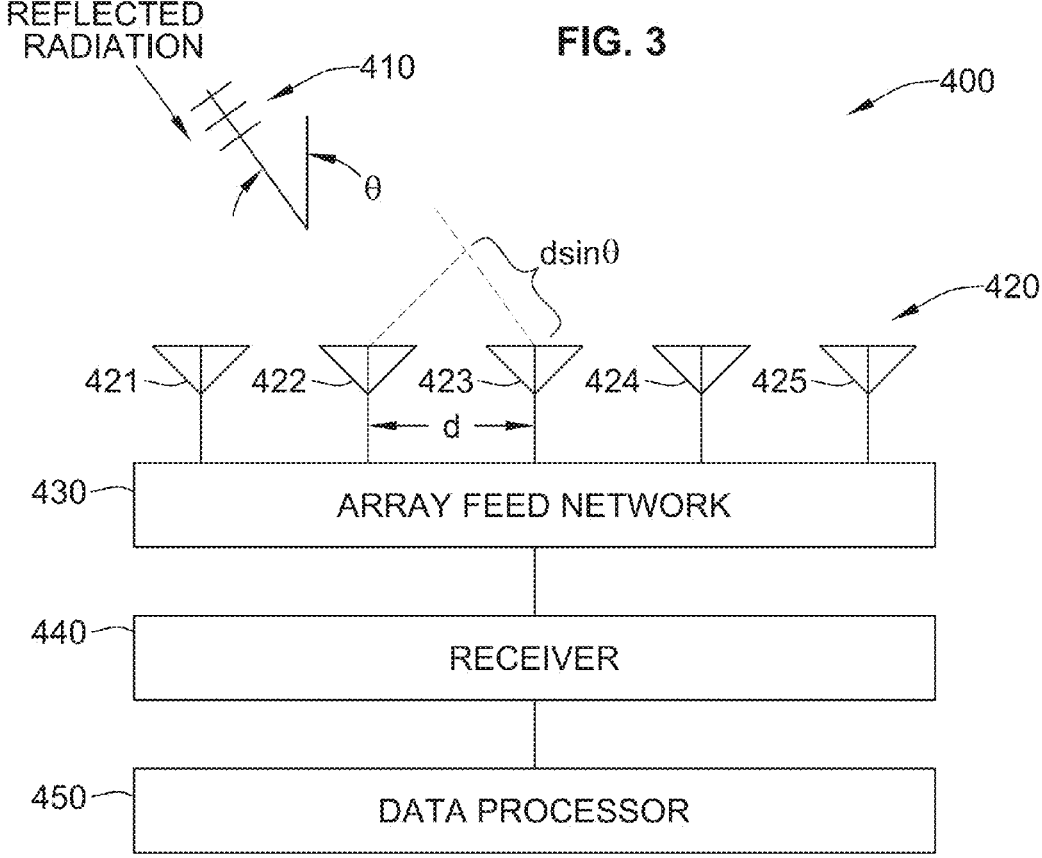
FIG. 4A is a diagram of an example receive antenna array receiving reflected radio signals.

FIG. 4A is a diagram of an example receive antenna array system 400 receiving reflected radio signals 410. The receive antenna array system 400 shown in FIG. 4A can be included in RADAR system, such as the RADAR system 300 described in connection with FIG. 3 above. The receive antenna array system 400 includes an antenna array 420, an array feed network 430, a receiver 440, and a processor 450. Incoming reflected radiation 410 is received at the antenna array 420. Individual antenna elements 421-425 in the antenna array 420 sample the incident radiation 410 at spatially separated locations. The antenna elements 421-425 in the antenna array 420 are connected to the array feed network 430 to convey signals to the receiver 440. The receiver 440 receives the signals from the array feed network 430 and conditions the received signals (e.g., via filtering, amplifying, down-converting, and the like) to send to the processor 450. The processor 450 may include a digital signal processor that analyzes the signals from the antenna array 420 to estimate the locations of reflective features responsible for the reflected radiation 410.

The antenna array 420 can be a linear array with antenna elements 421-425 arranged along a common line. The individual antenna elements 421-425 can be identical and can be regularly spaced (e.g., equal inter-element spacing) by distance d, as shown in FIG. 4A. For convenience in explanation, reference is made to a broadside direction of the antenna array 420, which is a direction normal to the line of the antenna elements 421-425 in the linear array.

The antenna array 420 can be used to identify the direction of the incident reflected radiation 410 according to the relative phase delay of the received radiation 410 at each antenna element 421-425. Generally, the physical separation between the antenna elements 421-425 in the array 420 result in differences in the path lengths of the incident radiation reaching each of the antenna elements 421-425 in the array 420. For radiation incident on the array 420 from an angle θ relative to the broadside direction, as shown in FIG. 4A, adjacent antenna elements receive phase shifted versions of the incident radiation 410 according to the path length difference between them.

For example, for the reflected radiation 410 incident on the array 420 from an angle θ relative to the broadside direction, the radiation reaching antenna element 423 travels an additional path length distance d sin θ as compared to the radiation reaching antenna element 422. The additional path length results in a phase shift between the signals received at antenna element 422 and antenna element 423 given by $$\Delta\phi = 2\pi \frac{d\sin\theta}{\lambda},$$

with λ being the wavelength of the incident radiation 410. In general, each of the antenna elements 421-425 in the array 420 sample the incident radiation as a different complex phasor $a_j$, as given by Equation 1:

$$a_j = A\exp\left(2\pi i \frac{jd\sin\theta}{\lambda}\right) \quad \text{(Eq. 1)}$$

with A an amplitude, $i=\sqrt{-1}$, and j an index for each element in the array, e.g., j=0 . . . N−1, for N antenna elements in the array.

Thus, the relative phases of the signals received at the different antenna elements 421-425 in the antenna array 420 can be used to determine the direction of the reflected radiation 410. However, to avoid ambiguities in distinguishing between signals from different directions, the separation distance d can be selected to avoid integer values of d/λ sin θ over a desired range of values of θ. At integer values of d/λ sin θ, adjacent antenna elements in the array 420 (e.g., the antenna elements 422, 423) receive substantially identical signals, which creates an ambiguity in the direction of the reflected radiation 410. Such ambiguous directions correspond to locations of grating lobes in the receive pattern of the receive array 420. In particular, for d/λ>1, the antenna array 420 will have grating lobes (and thus ambiguities) at d sin θ=±λ, ±2λ, . . . . For 0.5<d/λ<1, the antenna array 420 will avoid most ambiguities for suitable range of angle values (i.e., for θ<90°). For d/λ≤0.5, the antenna array 420 entirely avoids ambiguities.

Thus, the spacing between the adjacent antenna elements 421-425 may depend on the wavelength (or corresponding frequency) of the radiation used in the RADAR system 400. In some examples, the RADAR system 400 may use a frequency reserved for automotive RADAR use, such as frequencies in the 24-29 GHz band or 77-81 GHz band, for example. Separation distances between adjacent antenna elements (e.g., the distance d) may be approximately the wavelength distance, or half of the wavelength, for example. Thus, some embodiments may have separation distances in the millimeter range, such as separation distances between about 2 millimeters and about 6 millimeters. However, other frequency/wavelength ranges may also be used, including frequencies between 24 GHz and 81 GHz, and other frequency bands designated by regulatory authorities for use in automotive RADAR systems, including microwave bands.

The array feed network 430 may be arranged to convey signals from each antenna element 421-425 to the receiver 440 by providing, for example, one input to the receiver 440 for each antenna element 421-425. Alternatively, the array feed network 430 may selectively combine signals from groups of the antennas 421-425 to define sub-arrays, and provide one input for each such sub-array to the receiver 440. Each input to the receiver 440 from the array feed network 430 is a channel that represents the incident radiation sampled 410 from a spatially distinct portion of the array 420. Thus, each channel input to the receiver 440 can include signals from one or more of the antenna elements 421-425 in the array 420.

The array feed network 430 can convey the signals received at each antenna element 421-425 to the receiver 440 using one or more waveguides, for example. In some embodiments, the array feed network 430 can apply different phase shifts to signals from different antennas 421-425, for example, by an arrangement that provides different path lengths between the different antennas and the receiver 440, by passing signals from the different antennas through materials with different indexes of refraction, or by other techniques for introducing phase shifts. Thus, the array feed network 430 may provide a hardware-implemented phased antenna array with a directional receive pattern corresponding to orientations where the signals across the array 420 are coherently combined, for example.

The receiver 440 can then condition the signals from each channel for analysis by the signal processor 450, which may include a digital signal processing module, for example. The receiver 440 can filter, amplify, and/or down-convert the received signals and may provide a sampled digital stream of the resulting signal to the processor 450. The processor 450 can then process the signal information from the receiver 440 to estimate the location of the source of the reflected radiation 410. For example, the processor 450 can estimate a range to the reflective feature according to a time delay between emission and reception and can estimate a direction according to a relative phase relationship between signals received at the spatially distinct channels of the array 420.

Figure 4B:
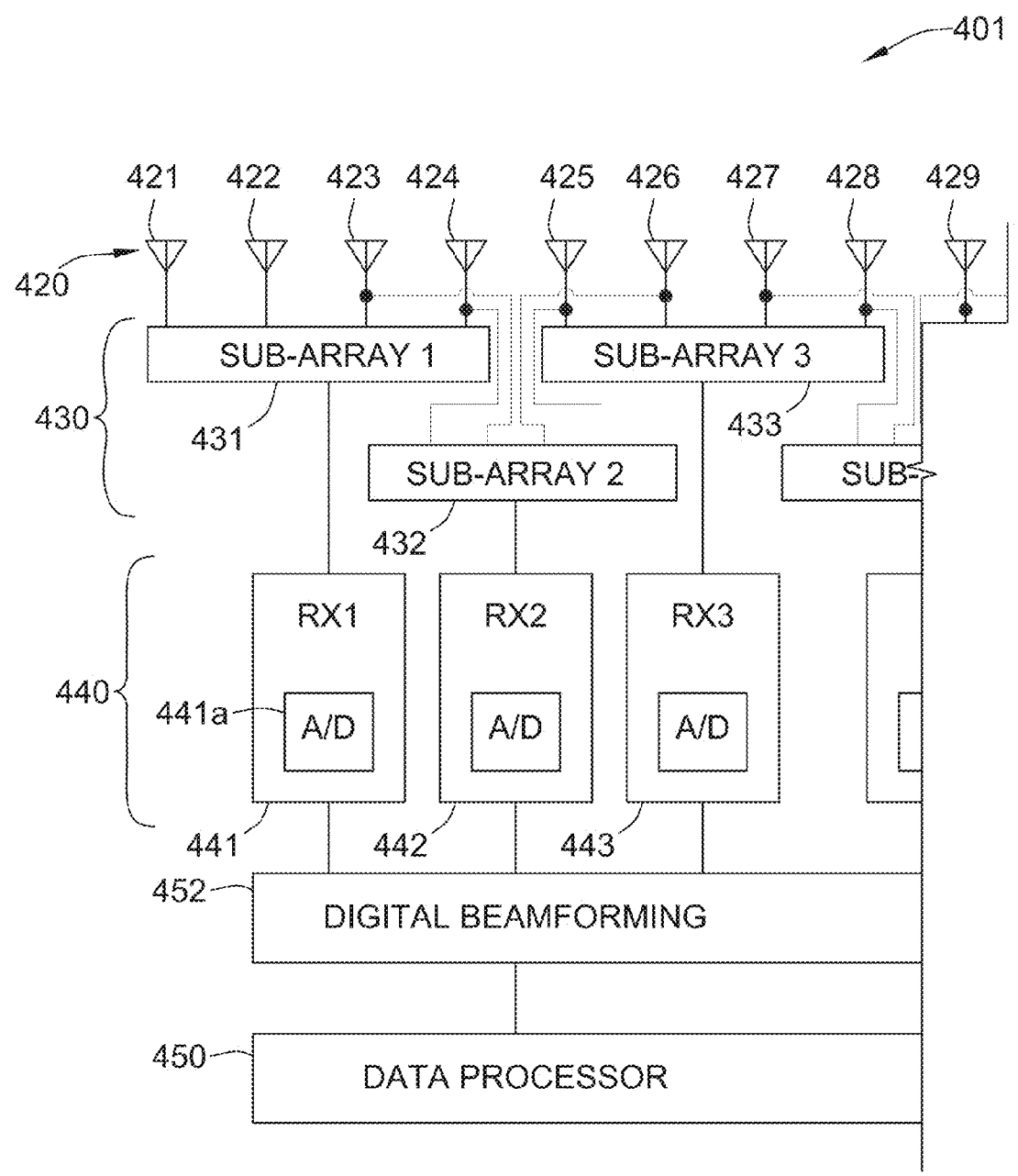
FIG. 4B is a diagram of an example receive antenna array that is arranged with overlapping sub-arrays.

FIG. 4B is a diagram of an example receive antenna array system 401 that is arranged with overlapping sub-arrays. The sub-arrays are defined by the antenna feed network 430, which selectively combines signals from groups of the antenna elements 421-429 to define sub-arrays. The sub-arrays of antenna elements are arranged in an overlapping fashion such that each sub-array shares half of its antenna elements with a neighboring sub-array. The array feed network 430 combines signals from the antenna array 420 using one or more signal combining components, which are represented in functional form as signal combining blocks 431-433.

Each of the signal combining blocks 431-433 receives signals from a group of antenna elements in the array 420 and provides a channel input to the receiver 440. Accordingly, the receiver 440 may include a receiver module 441-443 for each channel input. The receiver modules 441-443 can condition the input analog signal by filtering, amplifying, down-converting, etc. The conditioned signal can then be sampled and an analog-to-digital converter can be used to provide a stream of digital values to the processor 450. For example, the first signal combining block 431 combines signals from the first four adjacent antenna elements 421-424 and outputs a combined signal to the receiver module 441, which conditions the combined signal. The combined signal can then be sampled and converted to a stream of digital values using the analog-to-digital converter 441a. The resulting digital signal information can then be provided to the processor 450. The processor 450 may be a digital signal processor. In some embodiments, a digital beamforming module 452 can be included in the processor 450. Additionally or alternatively, the processor 450 can be in communication with a digital beamforming module. For example, the digital beamforming unit may apply amplitude and/or phase weights to the digital signal streams received on the different channels to perform digital beamforming with the antenna array 420.

The groupings of antenna elements 421-429 for each sub-array (and thus each channel input to the receiver 440) are defined by the array feed network 430. The array feed network can define sub-arrays from overlapping groups of antenna elements in the antenna array 420. The sub-arrays are shown and described herein by way of example as groups of four adjacent antenna elements in the array 420, although it is noted that the sub-arrays may include more than four antenna elements or less than four antenna elements, and may include non-adjacent antenna elements.

With reference to the example arrangement shown in FIG. 4B, a first sub-array includes the first four adjacent antenna elements 421-424, and the first signal combining block 431 combines the signals from the first four antenna elements 421-424 to create a first channel input to the receiver module 441. A third sub-array includes the next four adjacent antenna elements 425-428, and a third signal combining block 432 combines the signals from the antenna elements 425-428 to create a third channel input to the receiver module 443. A second signal combining block 432 combines the signals from the antenna elements 423-426 to create a second channel input to the receiver module 442. The second sub-array includes two antenna elements 423-424 that are included in the first sub-array and two antenna elements 425-426 that are included in the third sub-array. Thus, the second sub-array includes four adjacent antenna elements, one half of which are shared with the first sub-array and the other half of which are shared with the third sub-array. Thus, each of the sub-arrays defined by the signal combining blocks 431-433 share half of their antenna elements with neighboring sub-arrays on either side. However, the first sub-array includes the outer edge of the antenna array 420 so has a neighboring sub-array on only one side (i.e., the second sub-array), and as a result the first two antenna elements 421-422 are not shared with another sub-array.

The arrangement of overlapping sub-arrays can continue for an arbitrary number of such sub-arrays. For example, the third sub-array can share antenna elements 427-428 with a neighboring sub-array that is partially shown in FIG. 4B and that also includes antenna element 429. The array feed network 430 operates to convey combined signals from each of the overlapping sub-arrays to the receiver 440. In some embodiments, the array feed network 430 provides good isolation between the signals from different sub-arrays such that each channel output provided to the receiver 440 only includes signals from the antenna elements in the respective sub-array. In some embodiments, the array feed network 430 includes energy absorbing terminations to prevent internal reflections within the array feed network 430 from creating side lobes in the receive pattern of the antenna array 420 due to multi-path issues within the array feed network 430.

In some embodiments, each of the signal combining blocks 431-433 may include one or more signal couplers, signal dividers, etc. using waveguide technologies or other suitable devices for combining and/or dividing signals. The signal combining blocks 431-433 may be implemented as non-directional passive devices, such as by an arrangement of Wilkinson dividers, hybrid couplers, tee intersections, etc. Moreover, in some embodiments the signal combining blocks 431-433 may share hardware components with others of the signal combining blocks 431-433. For example, in a hardware implementation, the signal combining block 431 may share hardware components with the signal combining block 432. One example of such a shared arrangement for an array feed network is discussed below in connection with FIGS. 5 and 6.

As noted above, the channel input from each sub-array is indicative of measurements of the incident radiation from physically separated portion of the antenna array 420. In particular, each sub-array can be characterized by a phase center point at the mid-point of the antenna elements in the sub-array, and a width given by the span of the antenna elements in the sub-array. For example, the first sub-array can have a width given by the distance between the antenna elements 421, 424 and a phase center point at the mid-point between the antenna elements 422 and 423. The phase center points and widths of the second and third sub-arrays are similarly defined by the mid-point and spans of the antenna elements in those arrays. The span of the antenna elements for each sub-array can also be referred to as the aperture of the sub-array, because in some respects each sub-array performs similarly to an antenna with an aperture with dimension given by the span between the outer-most antenna elements in the sub-array. For example, as discussed below, the angular resolution of a particular sub-array is dependent on the span of the antenna elements in the sub-array similar to the angular resolution of a single antenna depending on the aperture of the antenna element.

By overlapping the sub-arrays in the antenna array 420, the phase center points of neighboring sub-arrays can be closer together than the sub-array widths. In the example overlapping arrangement shown in FIG. 4B, the phase center points of neighboring sub-arrays are separated by approximately one-half the sub-array width. Thus, the overlapping arrangement allows the apertures of each sub-array to spatially overlap with one another, because neighboring ones of the sub-arrays may include common antenna elements in their respective sub-arrays.

In some embodiments, arranging overlapping sub-arrays to be spatially separated by approximately half the width of each sub-array (e.g., by each sub-array sharing 50% of its antenna elements with a neighboring sub-array) allows for the RADAR system to avoid ambiguities caused by grating lobes.

For example purposes, the signals received at each sub-array, and the relationship to beam width and grating lobes are described below. The signal at each sub-array output (e.g., from one of the blocks 431-433 in the array feed network 430) is a weighted sum of the signals received at each antenna element. Thus, for a sub-array with m total antenna elements, the resulting signal is given by Equation 2 below.

$$p_{sub-array} = \sum_{sub-array} w_j a_j = A \sum_{j=0}^{m-1} w_j \exp\left(2\pi i \frac{jd\sin\theta}{\lambda}\right) \quad \text{(Eq. 2)}$$

The weighting factors $w_j$ provide a windowing across the sub-array elements. A uniform weighting is referred to as a rectangular window, but other windows may be used that attach relatively greater significance to the antenna elements nearest the center of the spatially distributed array, such as a Taylor window, Hamming window, Cosine window, Chevyshev window, etc. Each sub-array has a receive radiation pattern characterizing its sensitivity over a range of angles, and is determined at least in part on the particular values of m, $w_j$, and $d/\lambda$, as well as the properties of the particular antenna elements in the array. The beam width of the receive radiation pattern can be determined by identifying angles $\theta_{null}$ that lead to nulls in the evaluation of Equation 2, which occurs when the argument of the exponential evenly cover the complex unit circle over the summation. Such a null occurs for $$\frac{md\sin\theta}{\lambda} = 1.$$

Thus, the null-to-null beam width $\theta_B$ is given by Equation 3 below.

$$\theta_B = \{\text{null-to-null beam width}\} = 2\theta_{null} = 2\sin^{-1}\left(\frac{\lambda}{md}\right) \quad \text{(Eq. 3)}$$

The characteristic beam width is thus proportionate to the arcsine of the inverse of sub-array width, md.

The channel signal from each sub-array is thus a sample of the incoming radiation according to the directional radiation pattern of the individual sub-arrays. The processor 450 and/or beamforming unit 452 can use the combination of channel signals to estimate the direction of the incoming radiation by comparing the relative phases of the signals received on each channel. For example, the combination of channel signals can be correlated with a range of reference signals expected from different directions and estimates of the direction of arrival can be made based on the strength of correlation. In some embodiments, the correlations can be made by effectively applying weights and/or phase offsets to the signals on each channel (i.e., each sub-array) and then summing the resulting phase-shifted and weighted signals. Relative phase shifts and/or weights that result in relatively large summations may then correspond to directions from which the incident signal originated. Other examples for combining information from the spatially distinct channels of the antenna array 420 that each correspond to a sub-array can be employed to estimate direction of arrival of the incoming radiation.

However, the directional estimation may have ambiguities if the adjacent ones of the sub-arrays measure indistinguishable signals. Angles having such ambiguities are referred to as grating lobes in the receive radiation pattern of the antenna array 420. In addition, because there may be no absolute phase reference, ambiguities are also caused where adjacent sub-arrays receive signals that are 180 degrees offset in phase, that is $p_{j+1} = -p_j$. Such ambiguous angles $\theta_A$ occur for angles satisfying Equation 4 below.

$$\sin\theta_A = \pm\frac{\lambda}{2X}, \pm\frac{3\lambda}{2X}, \pm\frac{5\lambda}{2X}, \ldots \quad \text{(Eq. 4)}$$

where X is the spacing between each sub-array.

To avoid the effect of ambiguity angles caused by grating lobes, an array can be constructed with $\theta_B < \theta_A$, such that the minimum ambiguity angle falls outside the main beam width. Referring to Equations 3 and 4, the arrangement of sub-arrays can be constructed to comply with the inequality relationship by satisfying $X \le md/2$, where X is the spacing between each sub-array phase center and is the width of each sub-array. In some embodiments of the present disclosure, a sub-array arrangement is provided that avoids the minimum ambiguous angle within the beam width of each sub-array by a network of sub-arrays that overlap with one another, such that neighboring sub-arrays occupy approximately half of the same spatial region. In some embodiments, the overlapping arrangement includes sharing at least half of the antenna elements in a given sub-array with a neighboring sub-array.

For example, each sub-array can have a first half of antenna elements on one side of the sub-array and a second half of antenna elements on the other side of the sub-array. Each sub-array can share at least the first half of antenna elements with a neighboring sub-array nearest the first half and can share at least the second half of antenna elements with a neighboring sub-array nearest the second half. However, sub-arrays at the outer edges of the full antenna array may only share antenna elements with one neighboring sub-array because no neighboring sub-array is present along the outer edge, similar to the example shown and described in connection with FIG. 4B above.

In some embodiments, the spacing between adjacent sub-arrays can be about half of the width of each sub-array. In some embodiments, the spacing between adjacent sub-arrays can be less than half of the width of each sub-array. By sharing at least half (i.e., 50%) of their antenna elements with neighboring sub-arrays, the sub-arrays can be spaced closer together than achievable with a network of non-sharing sub-arrays (e.g., such as an arrangement where X=md).

The spacing between the adjacent antenna elements 421-429 may depend on the wavelength (or corresponding frequency) of the radiation used in the RADAR system 401. In some examples, the RADAR system 401 may use a frequency reserved for automotive RADAR use, such as frequencies in the 24-29 GHz band or 77-81 GHz band, for example. Separation distances between adjacent antenna elements (e.g., the distance d) may be approximately the wavelength distance, or half of the wavelength, for example. Thus, some embodiments may have separation distances in the millimeter range. However, other frequency/wavelength ranges may also be used, including frequencies between 24 GHz and 81 GHz, and other frequency bands designated by regulatory authorities for use in automotive RADAR systems, including microwave bands.

Figure 5:
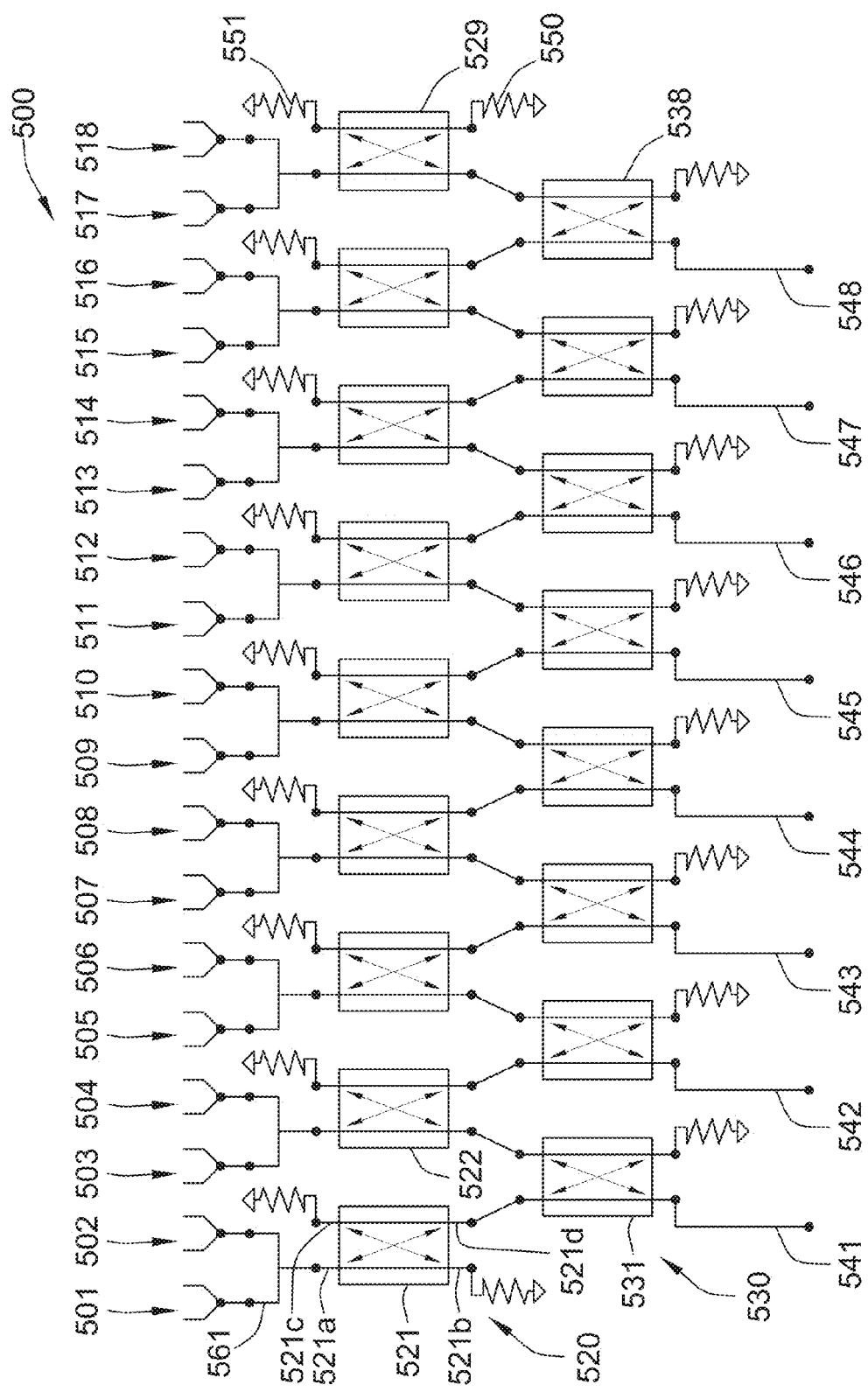
FIG. 5 is a diagram of a beamforming network that creates overlapping sub-arrays from an antenna array.

FIG. 5 is a diagram of an example beamforming network 500 that defines overlapping sub-arrays in an antenna array. The example beamforming network 500 receives signals from 18 antenna elements and outputs signals on 8 channels that each define a sub-array of the antenna elements. Each sub-array includes 4 adjacent antenna elements. The antenna elements 501-504 define a first sub-array, which corresponds to the first channel output 541. The first channel output 541 includes signals from the first four adjacent antenna elements 501-504. The signals from the first four antenna elements 501-504 are combined via a network of signal combiners 520, 530, which is discussed further below. The second sub-array overlaps the first sub-array by 50%, and accordingly includes antenna elements 503-506. The second sub-array corresponds to the second channel output 542. The overlapping sub-array pattern continues as follows: third sub-array includes antenna elements 505-508 and corresponds to the third channel output 543; the fourth sub-array includes antenna elements 507-510 and corresponds to the fourth channel output 544; the fifth sub-array includes antenna elements 509-512 and corresponds to the fifth channel output 545; the sixth sub-array includes antenna elements 511-514 and corresponds to the sixth channel output 546; the seventh sub-array includes antenna elements 513-516 and corresponds to the seventh channel output 547; and the eighth sub-array includes antenna elements 515-518 and corresponds to the eighth channel output 548. Each of the channel outputs 541-548 can be conveyed to a receiver architecture to amplify, filter, down-convert and/or otherwise condition the channel signals for further processing similar to the discussion above in connection with FIGS. 3-4.

As mentioned above, the example beamforming network 500 includes an arrangement of signal combiners. The arrangement of signal combiners is discussed by way of example below in connection with waveguide implemented signal combiners. Although, it is noted that the present disclosure may include embodiments employing other signal combining technologies as alternatives to, or in addition to, the waveguide-implemented examples provided below.

Signals from adjacent pairs of antennas are combined by coupling junctions, such as via non-directional Wilkinson power combining waveguide devices. Signals from antenna elements 501 and 502 are combined by power combiner 561, signals from antenna elements 503 and 504 are combined by another power combiner, and so on. Thus, the first sub-array (corresponding to channel output 541) is divided into a first half with the antenna elements 501 and 502, and a second half with the antenna elements 503 and 504. The antenna elements 503 and 504 are shared with the second sub-array as well. The power combiners can thus be used to combine signals from antenna elements in each half of the respective sub-arrays. In other embodiments, including embodiments with a different number of antenna elements in each sub-array, the passive power combiners (e.g., the power combiner 561) may be arranged to combine signals from antenna elements in subsets of each sub-array that will be shared with neighboring sub-arrays.

Upon signals from the antenna array being passed through the power combiners, the channel outputs can be formed by combining signals from each adjacent grouping of paired antennas (or sub-set of the sub-arrays to be shared with neighbors). A two-stage network of hybrid couplers is used to combine the signals and output the channel signals. The two-stage hybrid coupler arrangement described herein provides good isolation between the different channels and accounts for phase offsets introduced by the hybrid couplers such that the channel outputs are all referenced to a common phase.

An example operation of one of the hybrid coupler waveguide devices (e.g., the hybrid coupler 521) is described next. The hybrid coupler 521 has four ports 521a-d. An input port 521a receives input signals. The input signals are conveyed with the hybrid coupler 521 to a transmitted port 521b and a coupled port 521d. The power of the signals output from the transmitted port 521b and the coupled port 521d may divide the power from the input port 521a approximately equal, such as 3 dB loss on each of the transmitted port 521b and the coupled port 521d. However, the output from the coupled port 521d is quadrature phase shifted (e.g., by 90 degrees) relative to the output of the transmitted port 521b. As a result, the signals from the coupled port 521d and the transmitted port 521b are not referenced to a common phase.

The hybrid coupling device 521 also includes a second input port 521c, which can receive input signals and cause corresponding output signals to be emitted from the transmit port 521b and the coupling port 521d. However, the phase relationship of the output signals is reversed for signals input to the second input port 521c, relative to the first input port 521a. For example, a signal provided to the input port 521a may cause a 90° phase-shifted version to be output from the coupled port 521d, relative to the version output from the transmit port 521b. However, a signal provided to the second input port 521c may cause a 90° phase-shifted version to be output from the transmit port 521b, relative to the coupled port 521d.

The hybrid coupler device 521 can thus be a symmetric device in which signals input/output on the same side (e.g., the side with ports 521a, 521b or the side with ports 521c, 521d) are out of phase with signals conveyed from one side of the device to the other. For convenience, the signal paths through the hybrid coupling device can be referred to as transmit paths, which do not introduce a relative phase shift to the transmitted signal, and coupled paths, which do introduce a quadrature phase shift, relative to the signal on the transmit path. In the diagram in FIG. 5, the transmit paths correspond to the straight lines between ports 521a-b and between ports 521c-d, and the coupled paths correspond to the crossed arrows between ports 521a-d and between ports 521b-c.

The hybrid coupler waveguide device thus has a transmit path, along which signals are conveyed without receiving a quadrature phase shift offset, and a coupling path, along which signals are conveyed after receiving a quadrature phase shift offset. The waveguide coupling device 529 shows a transmit path 529e, which receives signals from an input port and outputs a transmitted signal (although perhaps with a 3 dB power loss). It should be noted that in some embodiments the waveguide coupling devices may also apply phase offsets to one or both of the transmitted signals, relative to the input signals. However, common phase offsets across the network of coupling devices do not affect the relative phase between signals on different channels (and amongst different channels) and so can generally be ignored.

To account for the quadrature phase shift between the transmitted port 521*b* and the coupled port 521*d*, the two stage network of waveguide couplers is arranged such that each signal path from the antenna elements 501-518 to one of the channel outputs 541-548 is conveyed through the same number of transmit paths and coupling paths of the hybrid coupling devices. As a result, signals at the channel outputs 541-548 have a common phase reference since all are phase shifted by the same amount relative to the signal measured with the antenna array. As shown in FIG. 5, each signal path from the antenna elements 501-518 to the channel outputs 541-548 can include two of the hybrid coupling devices, one of which is traversed along the transmit path (and which does not introduce a phase shift) and one of which is traversed along the coupling path (which does introduce a quadrature phase shift). Thus, the signals reaching the channel outputs 541-548 have a common phase reference relative to the signals received at the antenna elements 501-518.

In the example shown in FIG. 5, the network of hybrid coupling devices is shown in a two-stage arrangement. In the first phase 520, signals from one of the pairs of antenna elements (e.g., the pairs 501-502, 503-504, 505-506, etc.) are conveyed to an input port of a hybrid coupling device (e.g., the hybrid coupling devices 521-529). For hybrid coupling devices in the first stage 520 that are receiving signals from antenna pairs that are shared between multiple sub-arrays, both transmitted and coupled outputs are output from the first stage 520 to the second stage 530. The hybrid coupling devices 521, 529 receiving inputs from the antennas on the outer-most edges of the antenna array (i.e., from the antenna elements 501-502 and 517-518, which are the two sub-array halves that are not shared with neighboring sub-arrays).

In the second stage 530, hybrid coupling devices all receive two inputs and provide a single output to provide one of the channel outputs 541-548. Each of the hybrid coupling devices in the second stage 530 are thus connected such that one of the inputs is traverses a transmit path and the traverses a coupling path, to arrive at the channel output 541-548. The hybrid coupling devices in the second stage 530 are thus connected such that signals that traversed a transmit path in the first stage 520 are connected to traverse a coupling path in the third stage 530 and vice versa. For example, the hybrid coupling device 531 receives one input from the hybrid coupling device 521 that is connected to the first two elements 501, 502 in the first sub-array, and one input from the hybrid coupling device 522 connected to the other two antennas elements 503, 504 in the first sub-array. The signals from hybrid coupling device 521 are conveyed along a coupling path in the first stage 520, and are therefore connected to traverse a transmit path through the hybrid coupling device 531 in the third stage 530. On the other hand, the signals from the hybrid coupling device 522 are conveyed along a transmit path in the first stage 520, and are therefore connected to traverse a coupling path through the hybrid coupling device 531 in the third stage 530. Similarly, signals from the hybrid coupling device 522 that are conveyed along coupling path are connected to the a transmit path of a hybrid coupling device in the second stage 530, which is then connected to the second channel output 542.

The pattern is repeated across the entire array such that the quadrature phase shifting effects of the hybrid coupling devices are fully accounted for at the channel output ports 541-548. In some embodiments, to allow all signal paths between the antenna elements 501-518 and the channel outputs 541-548 to undergo a common phase shift, the hybrid couplers 521, 529 at the outer edge of the first stage 520 are connected with one conveying signals along a transmit path (e.g., the hybrid coupling device 529) and one conveying signals along a coupling path (e.g., the hybrid coupling device 521). In particular, the two hybrid couplers 521, 529 connected to the pairs of antennas 501-502, 517-518 that are not shared by neighboring sub-arrays are connected so as to ensure a the same number of signal paths traverse both transmit paths and coupling paths in the first stage 520. Doing so allows the outputs from the outer-edge hybrid couplers 521, 529 to be connected to the network of hybrid coupling devices in the second stage 530 and for the second stage 530 to have one hybrid coupling device (e.g. the coupling devices 531, 538, etc.) for each channel output 541-548.

As shown in FIG. 5, unused ports of the hybrid couplers that are not included in any of the signal paths between the antennas 501-518 and the channel outputs 541-548 can be connected to energy absorbing termination (illustrated as a resistive elements 550, 551 in FIG. 5) to avoid internal reflections within the network of signal coupling devices. It is noted that the two outer-edge hybrid coupling devices 521, 529 in the first stage 520 are each connected to two energy absorbing terminations while the remaining hybrid coupling devices in the network are each connected to one such termination. Including the energy absorbing terminations to thereby impede internal reflections reduces the occurrence of sidelobes in the receive radiation pattern for the antenna array. Moreover, the energy absorbing terminations 550, 551, etc. can reduce unintended coupling between different ones of the channel outputs 541-548 (e.g., by increasing the isolation between the different channels).

Figure 6:
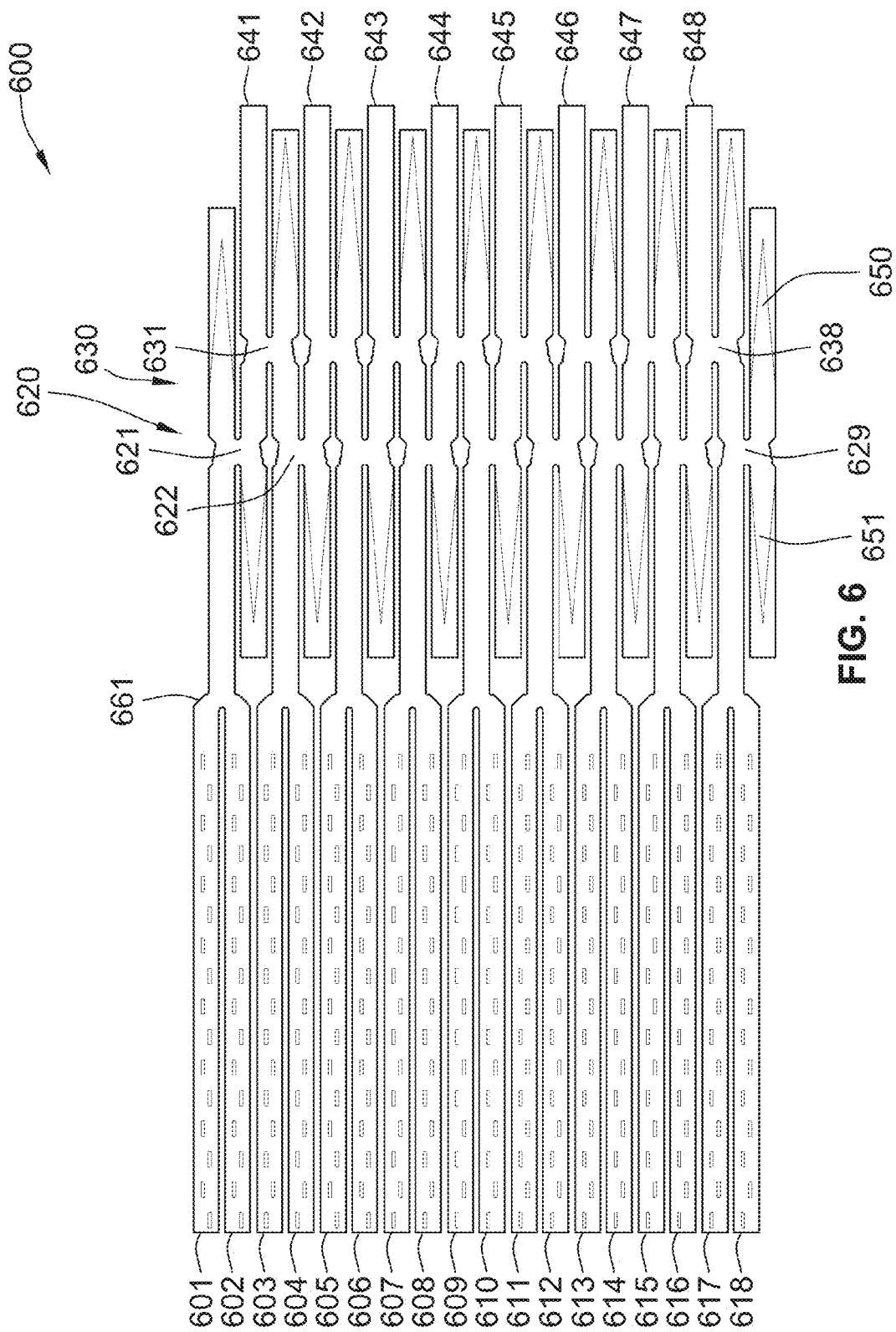
FIG. 6 is a top view of an example embodiment of the beamforming network shown in FIG. 5.

FIG. 6 is a top view of an example embodiment of the beamforming network shown in FIG. 5. The top view in FIG. 6 shows side walls creating a network of waveguide paths 600 for an array feed network connected to a linear array of 18 slotted waveguide antennas 601-618 arranged in a pattern of 8 overlapping sub-arrays that each include 4 antenna elements. The signals from the channel output ports 641-648 convey the signals from the different sub-arrays. For example, the channel output ports 641-648 may be connected to a printed circuit board including a receiver architecture, digital signal processing hardware, etc. In the network of waveguide paths 600, physical components corresponding to features in the diagram of FIG. 5 are indicated by reference numerals incremented by 100, relative to the counterparts in FIG. 5.

The network of waveguide paths 600 can be created by, for example, milling a block of conductive material at a constant depth to create channels corresponding to the pattern shown in FIG. 6. The network of waveguide paths 600 can also be created by stamping a conductive material with a suitable die to impress the desired pattern of sidewalls into the material. In such examples, a top layer of conductive material, such as a foil layer can be adhered (e.g., via a conductive adhesive) to the tops of the exposed side walls to enclose the waveguide paths. Additionally or alternatively, the top layer may be applied to the exposed tops of the sidewalls by a soldering process, such as a soldering process similar to one used for soldering printed circuit boards for making electrical connections. The top layer can also include apertures, such as slotted apertures to create one or more slotted waveguide antennas 601-618 connected to the network of waveguide paths 600. The conductive material used to create the waveguide sidewalls and/or cover may include, for example, aluminum, although alternatives may be used including copper, electroplated plastics, and/or other conductive materials, etc. It is noted that alternative techniques for creating the pattern of waveguide paths may be used such as microstrips arranged over dielectric substrates, waveguides integrated into laminar substrates, and other techniques for dividing and/or combining radio frequency signals.

In some embodiments, the network of waveguide paths 600 is constructed in a single layer that is co-planar, which may provide manufacturing advantages. In contrast to multi-layered waveguide structures, a single layer construction of, for example, a single milled block covered by a foil cover is less susceptible to registration errors inherently in multi-layered assemblies. Manufacturing and/or engineering tolerances may therefore be more relaxed, and product quality may be enhanced. In particular, manufacturing and/or design concerns related to registration of multiple layers may be reduced in comparison to devices constructed from multiple layers which are precisely aligned. Moreover, the co-planar single-layered assembly allows for a compact physical implementation of the array feed network, which can then be readily mounted in a compact location, such as on an autonomous vehicle.

The array feed network receives signals from each of the slotted waveguide antennas 601-618, and outputs a channel output signal for each sub-array from the channel output ports 641-648. The connection points to each of the slotted waveguide antennas can be referred to as antenna ports of the array feed network. Thus, the antenna ports for the array feed network can include the inputs to the plurality of signal combiners that combine signals from adjacent pairs of the antennas 601-618. For example, the signal combiner 661 includes two antenna ports of the array feed network, which are connected to the two slotted waveguide antennas 601, 602.

The signals from the slotted waveguide antennas 601-618 are first combined in pairs by Wilkinson waveguide power combiners (e.g., the signal combiner 661). The resulting set of 9 waveguided signals, each corresponding to half of one or more sub-arrays, are then passed through a two-stage arrangement of hybrid waveguide couplers 620, 630 to produce the 8 channel outputs 641-648 for each sub-array. Thus, the signals from the first two slotted waveguide antennas 601, 602 are connected to an input of the hybrid coupling device 621 in the first stage 620. The hybrid waveguide coupler 621 conveys the signals from the antennas 601-602 along a coupling path (introducing a quadrature phase shift), and those signals are then connected to a hybrid waveguide coupler 631 in the second stage 630. Similarly, signals from the slotted waveguide antennas 603-604 are combined and conveyed through a transmit path of the hybrid coupling device 622 in the first stage 620. The signals from the slotted waveguide antennas 603, 604 are then conveyed through the hybrid waveguide coupler 631 along a coupling path (introducing a quadrature phase shift). Thus, the combined signal for the first sub-array, at the first channel output port 641 has a common phase reference as signals conveyed from any of the antennas 601-604 are subjected to the same number of transmit paths and coupling paths through the network of hybrid waveguide couplers (e.g., the hybrid waveguide couplers 621, 622, 631).

The pattern is repeated across the array feed network such that all signals output from the channel output ports 641-648 have a common phase reference with the signals received at the slotted waveguide antennas 601-618. To complete the pattern the hybrid waveguide coupler 629 receiving signals from the slotted waveguide antennas 617-618 at the outer edge of the array conveys signals along a transmit path to complement the coupling path provided by the hybrid waveguide coupler 621 receiving signals from the opposing edge of the antenna array. Thus, all signals conveyed to any of the channel output ports 641-648 from any of the slotted waveguide antenna elements have a common phase reference, because each signal path traverses two hybrid waveguide couplers: one along a transmit path, and the other along a coupling path.

Energy absorbing terminations are connected to the unused ports of the hybrid couplers to reduce internal signal reflections and thereby provide isolation between the channel outputs 641-648 and also reduce side bands in the receive radiation pattern. For example, the energy absorbing terminations 650, 651 are connected to the unused ports of the hybrid waveguide coupler 629.

Figure 7:
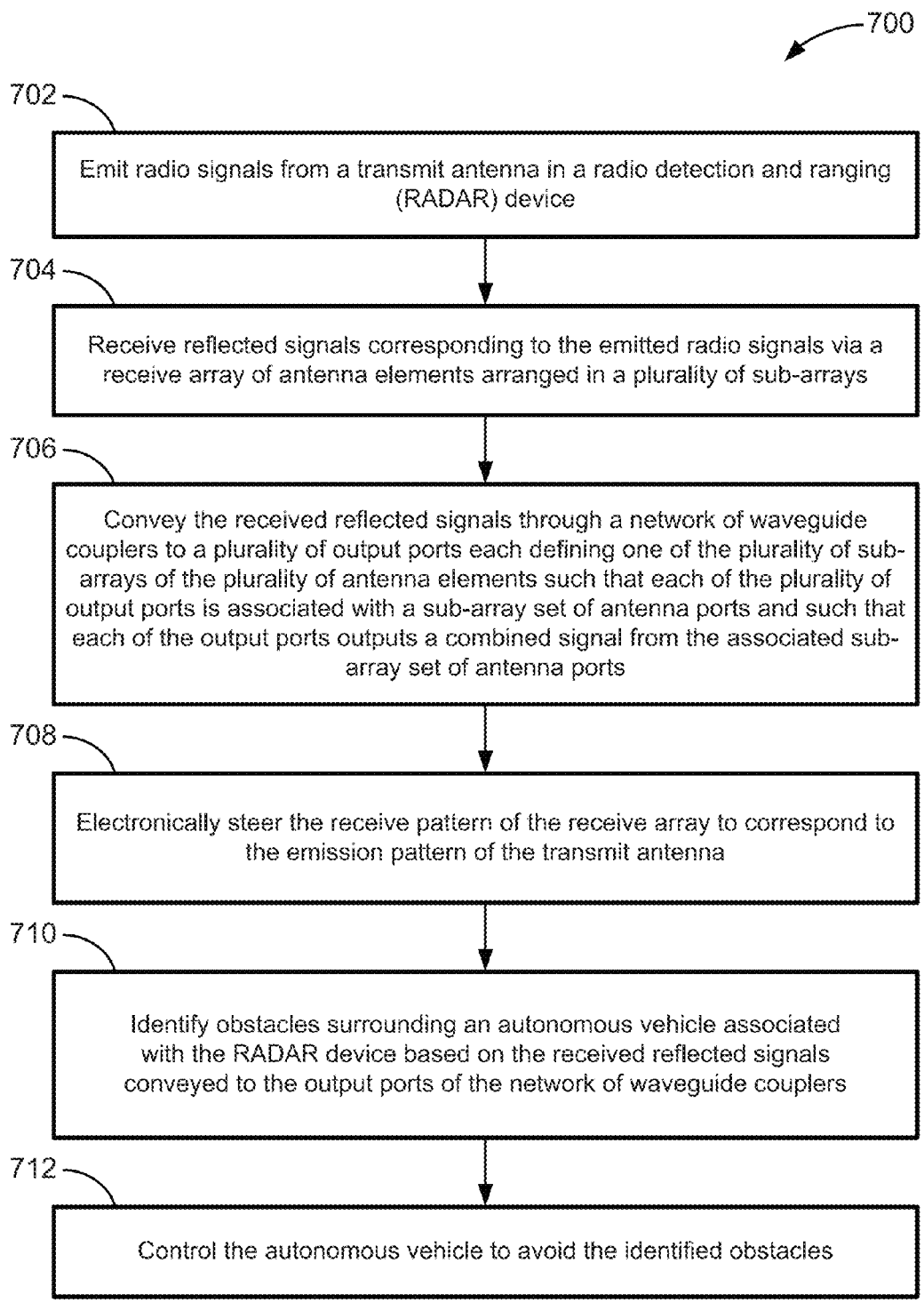
FIG. 7 is a flowchart of a process for operating a RADAR system according to an example embodiment.

FIG. 7 is a flowchart of a process 700 for operating a RADAR system according to an example embodiment. Radio signals can be emitted from a transmit antenna in a radio detection and ranging (RADAR) device (702). For example, signals can be emitted from the transmit antenna shown and described in connection with the RADAR system 300 in FIG. 3. Reflected signals corresponding to the emitted radio signals can be received via a receive array of antenna elements arranged in a plurality of sub-arrays (704). The received reflected signals can be conveyed through a network of waveguide couplers to a plurality of output ports each defining one of the plurality of sub-arrays (706). For example, the waveguide couplers can be arranged such that each output port provides a combined signal from an associated sub-array set of the antenna elements. Moreover, the sub-array sets can overlap with one another such that each sub-array set shares at least half of its antenna elements with a neighboring sub-array set.

The receive pattern of the receive array can be electronically steered to correspond to the emission pattern of the transmit antenna (708). For example, a set of phase offsets and or weighting factors can be applied to signals received from each sub-array via a beamforming unit, such as the digital beamforming unit 452 shown and described in connection with FIG. 4B above. Obstacles surrounding an autonomous vehicle associated with the RADAR device can be identified based on the received reflected signals conveyed to the output ports of the network of waveguide couplers (710). The autonomous vehicle can be controlled to avoid the identified obstacles (712). For example, blocks 710 and 712 may be implemented by hardware and/or software modules included in the autonomous vehicle 100 such as the navigation/pathing system 142, the sensor fusion algorithm 138, the obstacle avoidance system 144, etc.

Figure 8:
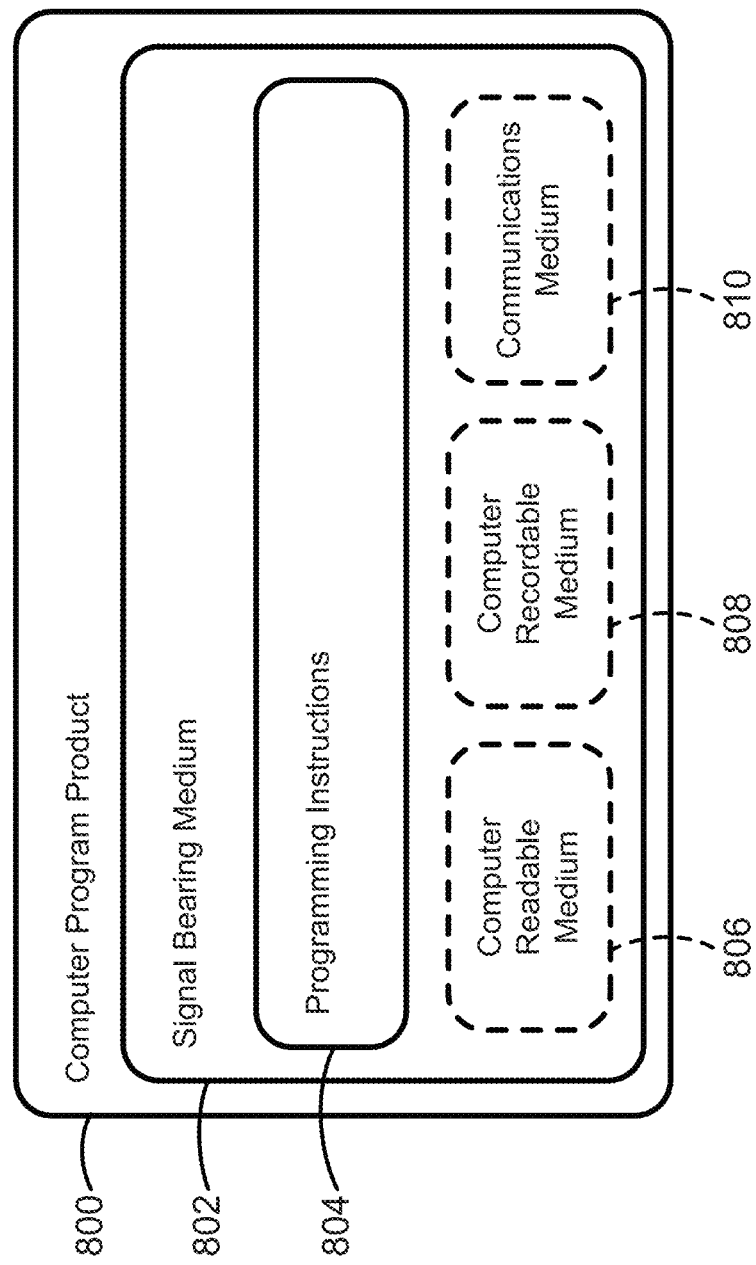
FIG. 8 depicts a non-transitory computer-readable medium configured according to an example embodiment.

FIG. 8 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above, such as the processes discussed in connection with FIG. 7 above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100 and/or instructions executed by the controller 310 of the RADAR system 300). FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 can be a non-transitory computer-readable medium 806, such as, but not limited to, a hard disk drive, a Compact Disc (CD), a Digital Video Disk (DVD), a digital tape, memory, etc. In some implementations, the signal bearing medium 802 can be a computer recordable medium 808, such as, but not limited to, memory, read/write (R/W) CDs, R/W DVDs, etc. In some implementations, the signal bearing medium 802 can be a communications medium 810, such as, but not limited to, a digital and/or an analog communication medium (e.g., a fiber optic cable, a waveguide, a wired communications link, a wireless communication link, etc.). Thus, for example, the signal bearing medium 802 can be conveyed by a wireless form of the communications medium 810.

The one or more programming instructions 804 can be, for example, computer executable and/or logic implemented instructions. In some examples, a computing device such as the computer system 112 of FIG. 1 is configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A device comprising:
    a plurality of antenna ports configured to receive signals from one or more antenna elements;
    a plurality of output ports;
    a plurality of waveguide couplers configured to convey the signals received at the plurality of antenna ports to the plurality of output ports such that a given output port provides a combined signal from a sub-array set of antenna ports which overlaps with a neighboring sub-array set of antenna ports by including at least half of the antenna ports in the neighboring sub-array set, wherein the plurality of waveguide couplers are formed by (i) a conductive base having a plurality of channels situated in a single planar layer, and (ii) a conductive foil connected to the conductive base so as to enclose the plurality of channels; and
    a plurality of slotted waveguide antennas connected to the plurality of antenna ports and arranged in a regularly spaced linear array that is co-planar with the conductive base such that each of the plurality of antenna ports, the plurality of output ports, the plurality of waveguide couplers, and the plurality of slotted waveguide antennas are arranged in the single planar layer.

2. The device according to claim 1, wherein the plurality of waveguide couplers is configured to impart a common phase shift to signals reaching the output ports, relative to the phase of signals received at the plurality of antenna ports, such that the combined signals provided at the output ports have a common phase reference.

3. The device according to claim 1, wherein the plurality of waveguide couplers is arranged such that signals conveyed from a given one of the plurality of antenna ports to one or more of the output ports pass through two hybrid couplers.

4. The device according to claim 3, wherein the plurality of hybrid couplers is configured such that the two hybrid couplers include:
    one hybrid coupler which imparts a quadrature phase shift to the signals being conveying to the one or more of the output ports; and
    another hybrid coupler which does not impart a phase shift to the signals being conveyed to the one or more of the output ports.

5. The device according to claim 1, further comprising a plurality of antenna elements connected to the plurality of antenna ports,
    wherein the plurality of antenna elements are arranged in a plurality of sub-arrays such that a given sub-array set of antenna ports is arranged to receive signals from a corresponding one of the plurality of sub-arrays,
    wherein a given sub-array is characterized by a center point in the middle of the antenna elements in the sub-array and a width defined by the span of the antenna elements in the sub-array, and
    wherein the plurality of waveguide couplers are arranged such that the center points of neighboring ones of the sub-arrays are separated by a separation distance less than or equal to the width of the neighboring ones of the sub-arrays, such that the plurality of sub-arrays have spatially overlapping apertures based on an amount of overlap between neighboring ones of the sub-array sets of antenna ports.

6. The device according to claim 1, further comprising energy absorbing terminations arranged so as to prevent internal reflections from paths in the plurality of waveguide couplers that are not used to convey signals from any of the antenna ports to one or more of the output ports.

7. The device according to claim 1,
    wherein the plurality of slotted waveguide antennas are arranged in a plurality of sub-arrays formed from overlapping sets of adjacent ones of the plurality of slotted waveguide antennas, and
    wherein the slotted waveguide antennas in a given one of the overlapping sets are connected to a respective one of the plurality of sub-array sets of the antenna ports.

8. The device according to claim 1, wherein the arrangement of channels define the plurality of waveguide couplers, and wherein the connection between the conductive foil and the conductive base define the waveguide paths of the plurality of waveguide couplers.

9. The device according to claim 8, wherein at least one of the conductive base or the conductive foil includes aluminum.

10. The device according to claim 1,
    wherein the plurality of antenna ports receive signals from respective antenna elements in an array of equally spaced antenna elements arranged in a plurality of sub-arrays each having an equal number of antenna elements, wherein each of the plurality of sub-arrays includes a first group of adjacent antenna elements and a second group of adjacent antenna elements, wherein, for each of the plurality of sub-arrays, the first and second group cumulatively include all of the antenna elements in the sub-array and each of the first and second groups include at least half of the antenna elements in the sub-array, and wherein the plurality of waveguide couplers are arranged such that each of the plurality of sub-arrays share the first group of antenna elements with a neighboring sub-array on one side and share the second group of antenna elements with a neighboring sub-array on another side, except for two sub-arrays that include the outer edges of the antenna element array, each of which only have a neighboring sub-array on one side and which only share one of the first and second groups of antenna elements with the neighboring sub-array on the one side.

11. A device comprising:
a transmit antenna configured to illuminate a scanning zone;
a receive array including a plurality of antenna elements configured to receive signals reflected from the scanning zone;
a waveguide device including:
   a plurality of antenna ports configured to receive signals from the plurality of antenna elements;
   a plurality of output ports;
   a plurality of waveguide couplers configured to convey the signals received at the plurality of antenna ports to the plurality of output ports such that a given output port provides a combined signal from a sub-array set of antenna ports which overlaps with a neighboring sub-array set of antenna ports by including at least half of the antenna ports in the neighboring sub-array set, wherein the plurality of waveguide couplers are formed by (i) a conductive base having a plurality of channels situated in a single planar layer, and (ii) a conductive foil connected to the conductive base so as to enclose the plurality of channels; and
   a plurality of slotted waveguide antennas connected to the plurality of antenna ports and arranged in a regularly spaced linear array that is co-planar with the conductive base such that each of the plurality of antenna ports, the plurality of output ports, the plurality of waveguide couplers, and the plurality of slotted waveguide antennas are arranged in the single planar layer; and
a receiver configured to receive, from the plurality of output ports, the combined signal for a given sub-array set.

12. The device according to claim 11, wherein the plurality of waveguide couplers is configured to impart a common phase shift to signals reaching the output ports, relative to the phase of signals at the plurality of antenna ports, such that combined signals provided at the output ports have a common phase reference.

13. The device according to claim 11, wherein the plurality of waveguide couplers is arranged such that signals conveyed from a given one of the plurality of antenna ports to one or more of the output ports pass through two hybrid couplers that include:
one hybrid coupler which imparts a quadrature phase shift to signals being conveyed to the one or more of the output ports; and
another hybrid coupler which does not impart a phase shift to signals being conveyed to the one or more of the output ports.

14. The device according to claim 11,
wherein a plurality of sub-arrays are formed from overlapping sets of adjacent ones of the plurality of slotted waveguide antennas.

15. The device according to claim 11,
wherein the plurality of antenna ports receive signals from respective antenna elements in an array of equally spaced antenna elements arranged in a plurality of sub-arrays each having an equal number of antenna elements, wherein each of the plurality of sub-arrays includes a first group of adjacent antenna elements and a second group of adjacent antenna elements, wherein, for each of the plurality of sub-arrays, the first and second group cumulatively include all of the antenna elements in the sub-array and each of the first and second groups include at least half of the antenna elements in the sub-array, and wherein the plurality of waveguide couplers are arranged such that each of the plurality of sub-arrays share the first group of antenna elements with a neighboring sub-array on one side and share the second group of antenna elements with a neighboring sub-array on another side, except for two sub-arrays that include the outer edges of the antenna element array, each of which only have a neighboring sub-array on one side and which only share one of the first and second groups of antenna elements with the neighboring sub-array on the one side.

16. The device according to claim 11, wherein the device is included in a radio detection and ranging (RADAR) system associated with an autonomous vehicle that is configured to use the received reflected signals to detect obstacles surrounding the autonomous vehicle and then control the autonomous vehicle to avoid the detected obstacles.

17. A method operable by a radio detection and ranging (RADAR) system associated with an autonomous vehicle, the method comprising:
receiving, by the RADAR system, reflected radio signals corresponding to emitted radio signals via a receive array of antenna elements, wherein the receive array of antenna elements is connected to a plurality of slotted waveguide antennas and arranged in a regularly spaced linear array;
conveying, by the RADAR system, the received reflected signals from a given one of the antenna elements in the receive array to a respective one of a plurality of antenna ports;
conveying, by the RADAR system, the signals received at the plurality of antenna ports, through a plurality of waveguide couplers, to a plurality of output ports, such that a given output port provides a combined signal from a sub-array set of antenna ports which overlaps with a neighboring sub-array set of antenna ports by including at least half of the antenna ports in the neighboring sub-array set, wherein the plurality of waveguide couplers are formed by (i) a conductive base having a plurality of channels situated in a single planar layer, and (ii) a conductive foil connected to the conductive base so as to enclose the plurality of channels;
conveying, by the RADAR system, combined signals for a given sub-array set from the plurality of output ports to a receiver on the autonomous vehicle;

the autonomous vehicle identifying obstacles surrounding the autonomous vehicle associated with the RADAR system based at least in part on the received combined signals; and controlling the autonomous vehicle so as to avoid the identified obstacles.

18. The method according to claim 17, wherein the conveying the signals through the plurality of waveguide couplers includes imparting common phase shift to signals reaching the output ports, relative to the phase of signals at the plurality of antenna ports, such that combined signals provided at the output ports have a common phase reference.

19. The method according to claim 17, further comprising:

transmitting radio signals from a transmit antenna in the RADAR system so as to illuminate a scanning zone, and thereby cause reflected radio signals to be reflected to the receive array; and manipulating combined signals conveyed to the receiver so as to electronically steer the receive pattern of the receive array to correspond to an emission pattern of the transmit antenna.

\* \* \* \* \*